US010314083B2

(12) United States Patent
Ishii

(10) Patent No.: US 10,314,083 B2
(45) Date of Patent: Jun. 4, 2019

(54) SYSTEMS AND METHODS FOR TRAFFIC OFFLOADING IN MULTI-RADIO-ACCESS-TECHNOLOGY NETWORKS

(71) Applicant: Sharp Laboratories of America, Inc., Camas, WA (US)

(72) Inventor: Atsushi Ishii, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 228 days.

(21) Appl. No.: 14/997,403

(22) Filed: Jan. 15, 2016

(65) Prior Publication Data
US 2017/0208499 A1 Jul. 20, 2017

(51) Int. Cl.
*H04W 28/04* (2009.01)
*H04W 72/04* (2009.01)
*H04W 74/08* (2009.01)
*H04W 28/08* (2009.01)

(52) U.S. Cl.
CPC ....... *H04W 74/0841* (2013.01); *H04W 28/08* (2013.01); *H04W 72/0486* (2013.01); *H04W 74/0825* (2013.01)

(58) Field of Classification Search
CPC .................. H04W 28/042; H04W 72/0486
See application file for complete search history.

(56) References Cited

U.S. PATENT DOCUMENTS

| 9,001,682 B2 | 4/2015 | Kovvali et al. | |
| 2007/0058661 A1* | 3/2007 | Chow | H04L 12/413 370/445 |
| 2012/0082146 A1* | 4/2012 | Andreasen | H04L 12/4633 370/338 |
| 2016/0337929 A1* | 11/2016 | Koskinen | H04W 36/24 |
| 2017/0214592 A1* | 7/2017 | Wigard | H04L 43/0811 |

FOREIGN PATENT DOCUMENTS

| EP | 2807860 | 8/2013 |
| EP | 2823670 | 9/2013 |
| WO | 2013171365 | 11/2013 |
| WO | 2014017855 | 1/2014 |

* cited by examiner

*Primary Examiner* — Laut Phung
(74) *Attorney, Agent, or Firm* — ScienBiziP, PC; Alvin Koan

(57) ABSTRACT

An offloading controller for traffic offloading in a multi-radio-access-technology (RAT) network is described. The offloading controller includes a processor and memory in electronic communication with the processor. Instructions stored in the memory are executable to determine a channel utilization threshold based on a likelihood of packet collisions in a contention-based access network. The multi-RAT network comprises a centralized resource management network and the contention-based access network. The instructions are also executable to determine whether to offload one or more user equipments (UEs) on the contention-based access network to the centralized resource management network by comparing a current channel utilization of the contention-based access network and the channel utilization threshold.

20 Claims, 12 Drawing Sheets

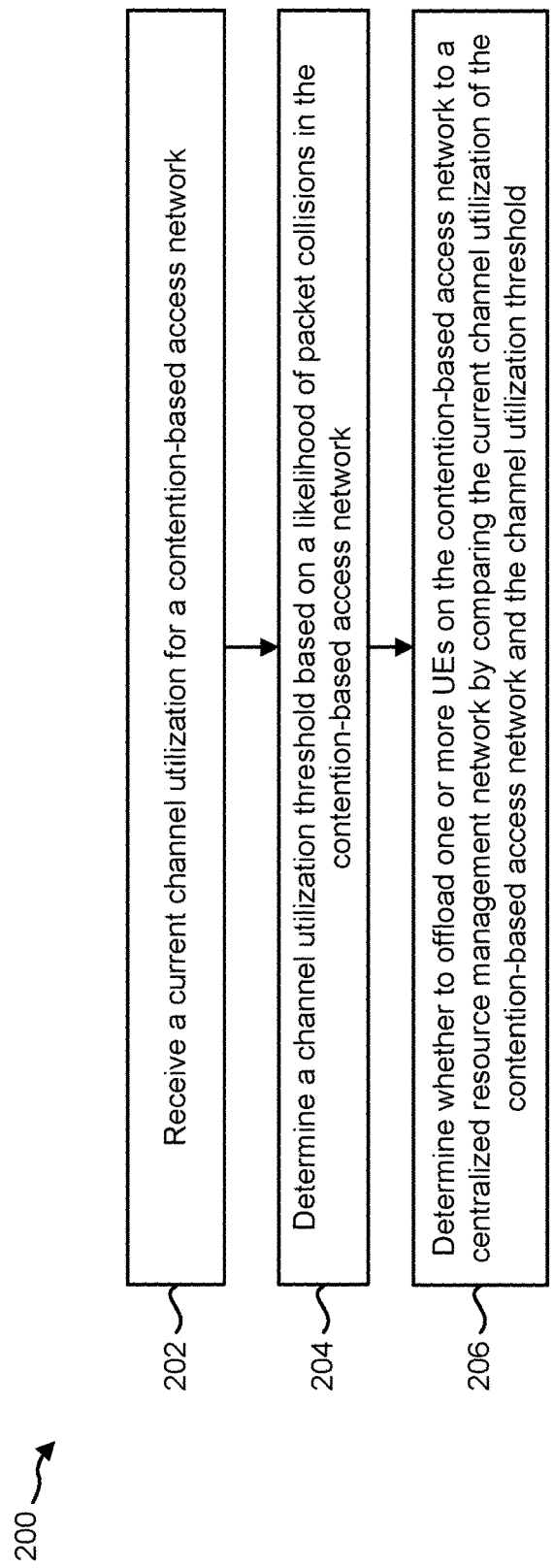

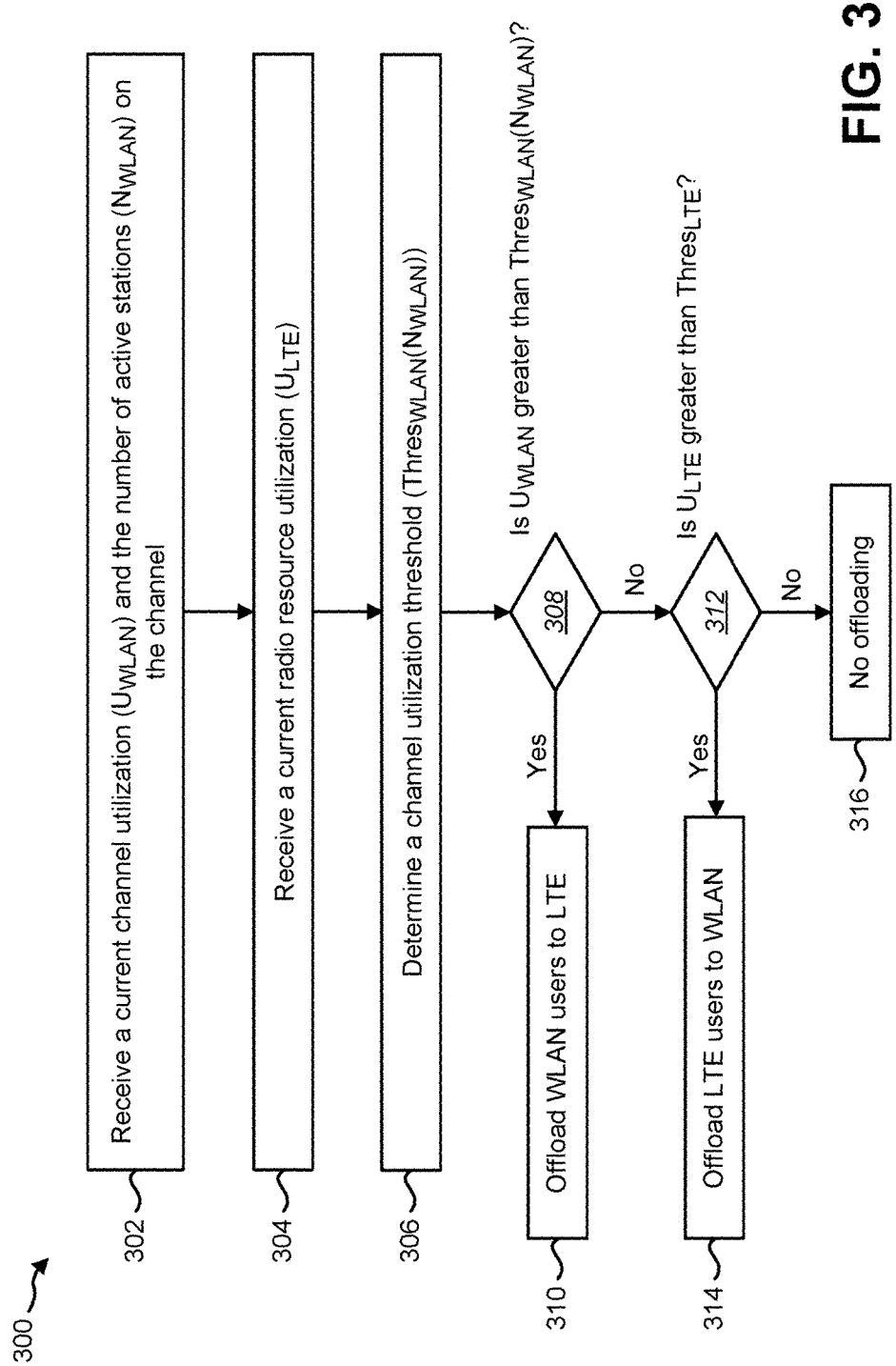

SYSTEMS AND METHODS FOR TRAFFIC OFFLOADING IN MULTI-RADIO-ACCESS-TECHNOLOGY NETWORKS

TECHNICAL FIELD

The present disclosure relates generally to communication systems. More specifically, the present disclosure relates to user equipments (UEs), base stations and methods for traffic offloading in multi-radio-access-technology (RAT) networks.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices on a multi-radio-access-technology (RAT) network. In some cases, the multi-RAT network may perform traffic offloading where one or more wireless communication devices are offloaded from one network to another network. As illustrated by this discussion, systems and methods that improve traffic offloading in multi-RAT networks may be beneficial.

BRIEF DESCRIPTION OF THE DRAWINGS

FIG. 2 is a flow diagram illustrating a method for traffic offloading in a multi-RAT network;

FIG. 3 is a flow diagram illustrating another method for offloading in a multi-RAT network;

DETAILED DESCRIPTION

Figure 1:
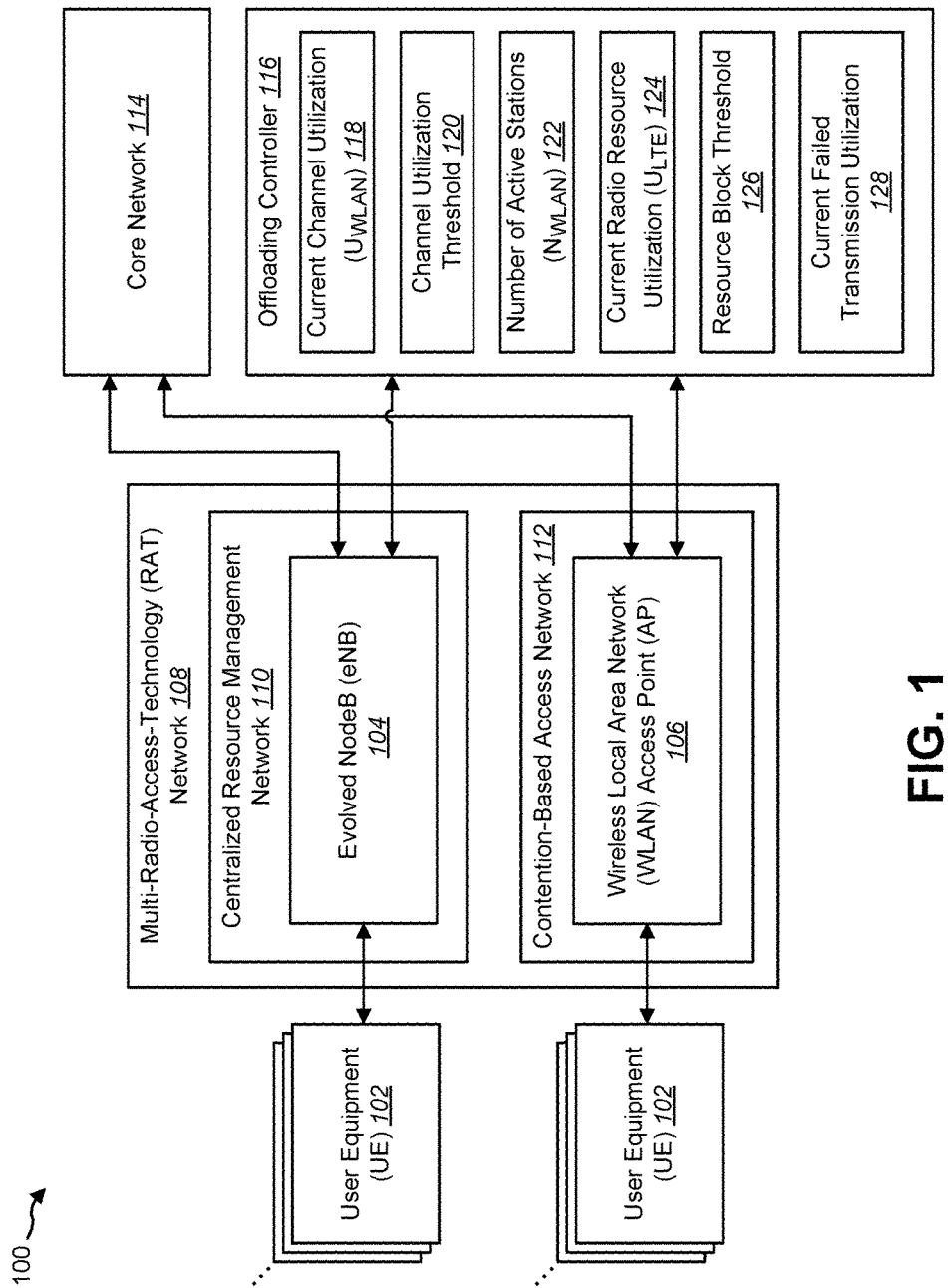
FIG. 1 is a block diagram illustrating a multi-radio-access-technology (RAT) network in which systems and methods for traffic offloading may be implemented.

An offloading controller for traffic offloading in a multi-radio-access-technology (RAT) network is described. The offloading controller includes a processor and memory in electronic communication with the processor. Instructions stored in the memory are executable to determine a channel utilization threshold based on a likelihood of packet collisions in a contention-based access network. The multi-RAT network includes a centralized resource management network and the contention-based access network. The instructions are also executable to determine whether to offload one or more user equipments (UEs) on the contention-based access network to the centralized resource management network by comparing a current channel utilization of the contention-based access network and the channel utilization threshold.

The channel utilization threshold may provide a maximum channel utilization on the contention-based access network as a function of an averaged number of active users on the contention-based access network. The likelihood of packet collisions in the contention-based access network may be measured by a number of stations actively transmitting on a radio channel of interest for a pre-determined duration. The likelihood of packet collisions in the contention-based access network may be based on the time where collided packets occupy a radio channel.

One or more UEs on the contention-based access network may be offloaded to the centralized resource management network when the current channel utilization of the contention-based access network is greater than the channel utilization threshold.

When the current channel utilization of the contention-based access network is less than channel utilization threshold, the instructions are further executable to determine whether to offload one or more UEs on the centralized resource management network to the contention-based access network by comparing a current radio resource utilization on the centralized resource management network and a resource block threshold. One or more UEs on the centralized resource management network may be offloaded to the contention-based access network when the current radio resource utilization on the centralized resource management network is greater than the resource block threshold. No offloading occurs when the current radio resource utilization on the centralized resource management network is less than the resource block threshold.

The centralized resource management network may be a long-term evolution (LTE) network. The contention-based access network may be an IEEE 802.11 wireless local area network (WLAN).

A method for traffic offloading in a multi-radio-access-technology (RAT) network is also described. The method includes determining a channel utilization threshold based on a likelihood of packet collisions in a contention-based access network. The multi-RAT network includes a centralized resource management network and the contention-based access network. The method also includes determining whether to offload one or more UEs on the contention-based access network to the centralized resource management network by comparing a current channel utilization of the contention-based access network and the channel utilization threshold.

A non-transitory computer-readable medium having instructions thereon is also described. The instructions include code for causing an offloading controller to determine a channel utilization threshold based on a likelihood of packet collisions in a contention-based access network. The multi-RAT network includes a centralized resource management network and the contention-based access network. The instructions also include code for causing the offloading controller to determine whether to offload one or more UEs on the contention-based access network to the centralized resource management network by comparing a current channel utilization of the contention-based access network and the channel utilization threshold.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11, 12 and/or 13). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may refer to any set of communication channels over which the protocols for communication between a UE and eNB that may be specified by standardization or governed by regulatory bodies to be used for International Mobile Telecommunications-Advanced (IMT-Advanced) or its extensions and all of it or a subset of it may be adopted by 3GPP as licensed bands (e.g., frequency bands) to be used for communication between an eNB and a UE. "Configured cells" are those cells of which the UE is aware and is allowed by an eNB to transmit or receive information. "Configured cell(s)" may be serving cell(s). The UE may receive system information and perform the required measurements on all configured cells. "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating a multi-radio-access-technology (RAT) network 108 in which systems and methods for traffic offloading may be implemented. The system 100 may include a multi-RAT network and one or more UEs 102. The UEs 102 may be configured to communicate using different RATs.

The multi-RAT network 108 may include a centralized resource management network 110 and a contention-based access network 112. In an implementation, the centralized resource management network 110 may be a 3GPP network (e.g., EUTRAN, UTRAN, long-term evolution (LTE), etc.). The centralized resource management network 110 may include one or more evolved nodeBs (eNBs) 104. An eNB 104 may provide wireless access to the centralized resource management network 110.

In an implementation, the contention-based access network 112 may be a wireless local area network (WLAN). The contention-based access network 112 may operate according to IEEE 802.11 (e.g., WiFi) standard specifications. The contention-based access network 112 may also be referred to as a WLAN. The contention-based access network 112 may include one or more WLAN access points (APs) 106 that provide access to the contention-based access network 112.

A UE 102 may be configured for wireless communication with either the eNB 104 on the centralized resource management network 110 or the WLAN access point 106 on the contention-based access network 112. For example, a UE 102 may perform LTE communications with the eNB 104 or WiFi communications with the WLAN access point 106.

The one or more eNBs 104 and WLAN access points 106 may communicate with a core network 114. The core network 114 may route voice calls and data traffic and perform other administrative operations within the multi-RAT network 108.

The eNB 104 and the WLAN access point 106 may provide coverage for a plurality of UEs 102. In other words, a plurality of UEs 102 may gain access to the centralized resource management network 110 via the eNB 104. Similarly, a plurality of UEs 102 may gain access to the contention-based access network 112 via the WLAN access point 106. The eNB 104 and the WLAN access point 106 may be physically located separately or at the same location.

The multi-RAT network 108 may perform offloading of UEs 102 between the centralized resource management network 110 and the contention-based access network 112. The recent trend of rapidly increasing data traffic volume over cellular networks (e.g., GSM, CDMA, LTE, etc.) has brought increased attention to unlicensed bands, such as the industrial, scientific and medical (ISM) band. In 3GPP there are ongoing discussions about the potential of using unlicensed spectrum to benefit cellular networks. For example, integrating wireless local area networks (WLANs) into cellular networks may allow cellular network data to be offloaded to the unlicensed bands to relieve network strain.

Offloading traffic to an unlicensed band, however, does not always result in better network performance. In general, unlicensed bands have no admission control, resource management or interference management. In some cases, offloading traffic from a controlled cellular network (e.g., centralized resource management network 110) to a crowded unlicensed network (e.g., contention-based access network 112) will end up with degrading the overall system performance. Therefore, it is beneficial that the offloading decision take into account the conditions of both the source network and the target network.

3GPP recently standardized the framework of traffic offloading between a 3GPP network (e.g., EUTRAN, UTRAN, etc.) and an IEEE 802.11 WLAN. A 3GPP network is one example of a centralized resource management network 110. A 3GPP network may provide each UE 102 an offloading policy. The UE 102 may then dynamically select the network according to the congestion states of the radio access networks (RATs).

In some implementations, a UE 102 served by EUTRAN will be offloaded to WLAN when the EUTRAN congestion status is above a threshold and the WLAN congestion status is under another threshold. In these implementations, both the thresholds are given by the offloading policy. On the other hand, a UE 102 served by WLAN will be offloaded to EUTRAN when the WLAN congestion status is above a threshold and the EUTRAN congestion status is under another threshold.

In the IEEE 802.11 standard specifications, the WLAN congestion status, broadcasted by WLAN access points 106, includes channel utilization 118. As used herein, channel utilization 118 refers to the percentage of time that a WLAN access point 106 senses the medium (e.g., channel) as busy. In some approaches, the offloading policy includes a constant threshold for the channel utilization to avoid offloading UEs 102 to and/or trigger offloading UEs 102 from congested contention-based access networks 112.

In general, the channel utilization 118 at which a WLAN system reaches its peak throughput (referred to as maximum channel utilization hereafter) varies depending on the likelihood of packet collisions. For instance, when only one station transmits packets on a WLAN channel, the maximum channel utilization is relatively high due to no collisions. Meanwhile, when many stations seek transmission opportunities on the same channel, the peak performance is reached with relatively low channel utilization and the performance starts degrading as the channel utilization 118 goes higher. As used herein, the term "station" refers to a wireless communication device that uses radio resources. For example, a station may include one or more of a UE 102, an eNB 104 or a WLAN access point 106.

The offloading threshold for WLAN channel utilization given by the offloading policy as a constant value does not take into account the system peak performance or the collision likelihood. As a result, if the constant threshold is higher than the maximum channel utilization, the offloading to the WLAN system will reduce the overall system throughput caused by the overly congested WLAN network. On the other hand, if the constant threshold is lower than the maximum channel utilization, the overall system may lose opportunities to mitigate EUTRAN congested situations by not fully utilizing the WLAN capacity.

The systems and methods described herein provide an optimum offloading scheme for a multi-RAT network 108 that includes at least one centralized resource management network 110 (e.g., 3GPP EUTRAN) and at least one contention-based access network 112 (e.g., WLAN) coexisting in an area. The total system throughput of the multi-RAT network 108 may be optimized by dynamically changing a channel utilization threshold 120 for offloading to/from the contention-based access network 112 based on the likelihood of packet collisions.

In an implementation, an offloading controller 116 may collect radio/network status from the eNB 104 and WLAN access point 106 to make offloading actions for UEs 102. While the offloading controller 116 is depicted as a separate entity in FIG. 1, the offloading controller 116 can be physically located inside the core network 114 or collocated in the eNB 104 or the WLAN access point 106.

In one approach, the offloading controller 116 may measure the likelihood of packet collisions in the contention-based access network 112 based on the number of active stations 122 transmitting on the radio channel of interest for a pre-determined duration. The eNB 104 may constantly monitor the current radio resource utilization ($U_{LTE}$) 124. In the case of LTE, the radio resource utilization may be referred to as LTE resource block utilization. The $U_{LTE}$ 124 may be measured as the ratio of the number of resource blocks (RBs) allocated for UEs 102 to the number of available RBs. The $U_{LTE}$ 124 may be sent to the offloading controller 116.

At least one station (e.g., the WLAN access point 106) that belongs to the contention-based access network 112 may monitor the channel utilization ($U_{WLAN}$) 118 of a radio channel of interest. The WLAN access point 106 may monitor the current $U_{WLAN}$ 118 and may send a channel utilization report to the offloading controller 116. As described above, the current $U_{WLAN}$ 118 may be the percentage of time that the WLAN access point 106 sensed a radio channel of interest was busy.

The WLAN access point 106 may also monitor the number of active stations ($N_{WLAN}$) 122 on the channel. This may include the number of stations that have transmitted data to the radio channel averaged over a pre-determined length of time. It should be noted that these stations may include not only the UEs 102 associated with the WLAN access point 106 but also other nearby access points and/or UEs 102 sharing the same radio channel. The WLAN access point 106 may report $N_{WLAN}$ 122 to the offloading controller 116.

The offloading controller 116 may evaluate the statistics that relate to the likelihood of packet collisions. A pre-determined relationship between the maximum channel utilization and the statistics for the contention-based access network 112 may be used.

Figures 4A, 4B:
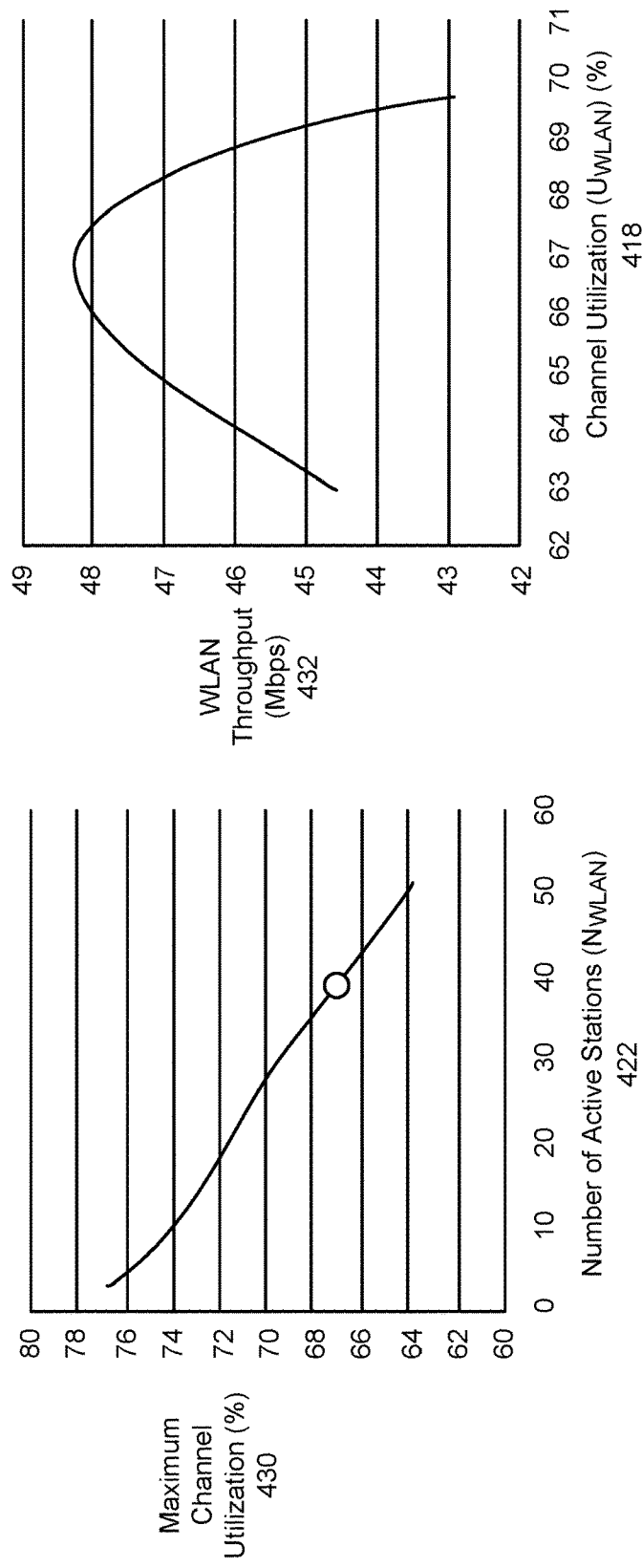
FIGS. 4A and 4B are examples illustrating simulation results of WLAN network performance.

In an implementation, the offloading controller 116 may determine a channel utilization threshold 120 based on a likelihood of packet collisions in the contention-based access network 112. The channel utilization threshold 120 may be a pre-determined function of $N_{WLAN}$ 122 that provides the maximum WLAN channel utilization for optimum performance. FIG. 4A describes a process for pre-determining the function for the channel utilization threshold 120 using one simulation result. In one implementation, the maximum channel utilization as a function of the number of active station 122 may be the function for the channel utilization threshold 120.

A process of making a decision for offloading to/from the contention-based access network 112 by comparing the current channel utilization ($U_{WLAN}$) 118 and the maximum channel utilization may be made as a function of the statistics. In an implementation, the offloading controller 116 may compare $U_{WLAN}$ 118 with the channel utilization threshold 120. If $U_{WLAN}$ 118 is greater than the channel utilization threshold 120, the offloading controller 116 may determine to offload one or more UEs 102 on the contention-based access network 112 to the centralized resource management network 110.

The offloading controller 116 may be further configured with a resource block threshold 126. The resource block threshold 126 may be a pre-determined threshold for RB utilization on the centralized resource management network 110 to determine radio channel congestion. The offloading controller 116 may compare $U_{LTE}$ 124 to the resource block threshold 126 to determine whether to offload one or more UEs 102 on the centralized resource management network 110 to the contention-based access network 112. In an implementation, if $U_{LTE}$ 124 is greater than the resource block threshold 126 but $U_{WLAN}$ 118 is less than the channel utilization threshold 120, the offloading controller 116 may determine to offload one or more UEs 102 on the centralized resource management network 110 to the contention-based access network 112.

In an implementation, the offloading decision made by the offloading controller 116 may be conveyed to the target UEs 102 selected by the offloading controller 116 over the WLAN and/or LTE radio channels. In another implementation, the offloading controller 116 may broadcast an offloading indication to the radio network (WLAN or LTE) whose users need to be offloaded to the other (source network). The users that receive the indication may start moving to the target radio network after a randomly determined back-off time. Offloading may continue until the offloading controller 116 broadcasts another indication to stop offloading.

In another implementation, the channel utilization threshold 120 is based on the failed transmission utilization 128 of the contention-based access network 112. The failed transmission utilization 128 may be defined as a ratio of time where the channel is occupied by collided packets.

In this implementation, the WLAN access point 106 may collect the current channel utilization ($U_{WLAN}$) 118 and the current failed transmission utilization 128. The WLAN access point 106 may report $U_{WLAN}$ 118 and the current failed transmission utilization 128 to the offloading controller 116. The offloading controller 116 may offload one or more UEs 102 until the current failed transmission utilization 128 and $U_{WLAN}$ 118 become close to the channel utilization threshold 120. This is described in more detail in connection with FIG. 10.

In this implementation, the WLAN access point 106 does not have to keep track of the number of active stations ($N_{WLAN}$) 122. Instead, the WLAN access point 106 may monitor the channel utilizations (i.e., $U_{WLAN}$ 118 and the failed transmission utilization 128).

FIG. 2 is a flow diagram illustrating a method 200 for traffic offloading in a multi-radio-access-technology (RAT) network 108. The multi-RAT network 108 may include a centralized resource management network 110 and a contention-based access network 112. The centralized resource management network 110 may include one or more eNBs 104. The contention-based access network 112 may include one or more WLAN access points 106.

An offloading controller 116 may receive 202 a current channel utilization ($U_{WLAN}$) 118 for a contention-based access network 112. The current channel utilization ($U_{WLAN}$) 118 may be included in a channel utilization report sent by a WLAN access point 106. The current channel utilization ($U_{WLAN}$) 118 may be the percentage of time that a WLAN access point 106 sensed the channel was busy.

The offloading controller 116 may also receive the number of active users ($N_{WLAN}$) 122 on the channel. This may include the number of stations that have transmitted data to the radio channel averaged over a pre-determined length of time. The WLAN access point 106 may monitor and send $N_{WLAN}$ 122 to the offloading controller 116.

The offloading controller 116 may determine 204 a channel utilization threshold 120 based on a likelihood of packet collisions in the contention-based access network 112. The likelihood of packet collisions in the contention-based access network 112 may be based on the time where collided packets occupy a radio channel. In an implementation, the likelihood of packet collisions in the contention-based access network 112 may be measured based on the number of active users ($N_{WLAN}$) 122 on the radio channel of interest for a pre-determined duration.

The channel utilization threshold 120 may provide a maximum channel utilization on the contention-based access network 112 as a function of the averaged number of active users ($N_{WLAN}$) 122 on the contention-based access network 112. The channel utilization threshold 120 may be a pre-determined function of $N_{WLAN}$ 122 that provides the maximum WLAN channel utilization for optimum performance.

The offloading controller 116 may determine 206 whether to offload one or more UEs 102 on the contention-based access network 112 to the centralized resource management network 110 by comparing the current channel utilization ($U_{WLAN}$) 118 of the contention-based access network 112 and the channel utilization threshold 120. One or more UEs 102 on the contention-based access network 112 may be offloaded to the centralized resource management network 110 when $U_{WLAN}$ 118 is greater than the channel utilization threshold 120.

FIG. 3 is a flow diagram illustrating another method 300 for offloading in a multi-RAT network 108. The multi-RAT network 108 may include a centralized resource management network 110 and a contention-based access network 112. The centralized resource management network 110 may include one or more eNBs 104. The centralized resource management network 110 may be a long-term evolution (LTE) network. The contention-based access network is an IEEE 802.11 wireless local area network (WLAN) The contention-based access network 112 may include one or more WLAN access points 106.

An offloading controller 116 may receive 302 the current channel utilization ($U_{WLAN}$) 118 and the number of active stations ($N_{WLAN}$) 122 on the channel. A WLAN access point 106 may monitor the $U_{WLAN}$ 118 and the $N_{WLAN}$ 122 and report this to the offloading controller 116. $U_{WLAN}$ 118 may be the percentage of time that the WLAN access point 106 senses a radio channel of interest was busy. $N_{WLAN}$ 122 may include the number of stations that have transmitted data to the radio channel averaged over a pre-determined length of time.

The offloading controller 116 may receive 304 the current radio resource utilization ($U_{LTE}$) 124. An eNB 104 may constantly monitor $U_{LTE}$ 124 and report it to the offloading controller 116. The $U_{LTE}$ 124 may be measured as the ratio of the number of resource blocks (RBs) allocated for UEs 102 to the number of available RBs.

The offloading controller 116 may determine 306 a determine a channel utilization threshold (Thres$_{WLAN}$($N_{WLAN}$)) 120. The Thres$_{WLAN}$($N_{WLAN}$) 120 may be a pre-determined function of $N_{WLAN}$ 122 that provides the maximum WLAN channel utilization for optimum performance on the WLAN. Using the $N_{WLAN}$ 122, the offloading controller 116 may dynamically determine the channel utilization threshold (Thres$_{WLAN}$($N_{WLAN}$)) 120.

The offloading controller 116 may compare $U_{WLAN}$ 118 to Thres$_{WLAN}$($N_{WLAN}$) 120. If the offloading controller 116 determines 308 that $U_{WLAN}$ 118 is greater than Thres$_{WLAN}$($N_{WLAN}$) 120, then the offloading controller 116 may offload 310 one or more WLAN users to LTE. In other words, the offloading controller 116 may offload one or more UEs 102 on the WLAN to the LTE network since the WLAN is overcrowded. If the offloading controller 116 determines 308 that $U_{WLAN}$ 118 is not greater than Thres$_{WLAN}$($N_{WLAN}$) 120, then this means that the WLAN has some room to accept extra traffic and therefore the LTE utilization may be evaluated.

The offloading controller 116 may determine 312 whether $U_{LTE}$ 124 is greater than a resource block threshold (Thres$_{LTE}$) 126. The Thres$_{LTE}$ 126 may be a pre-determined threshold for RB utilization on the LTE network (i.e., centralized resource management network 110) to determine radio channel congestion. If $U_{LTE}$ 124 is greater than Thres$_{LTE}$ 126, then the offloading controller 116 may offload 314 LTE users to WLAN. In other words, the offloading controller 116 may offload one or more UEs 102 on the LTE network to the WLAN since the LTE network is overcrowded and the WLAN has additional capacity. If the offloading controller 116 determines 414 $U_{LTE}$ 124 is not greater than Thres$_{LTE}$ 126, then no offloading takes place (step 316).

It should be noted that that the decision to offload from WLAN to LTE (Step 310) may be made regardless of the LTE congestion state. Reducing the traffic of an overly crowded WLAN will increase the WLAN throughput, whereas adding more users to the LTE network does not degrade the total LTE throughput since the LTE users simply share the radio resources without contentions.

FIGS. 4A and 4B are examples illustrating simulation results of WLAN network performance. FIG. 4A shows the relationship between the maximum channel utilization 430 and the number of active stations 422 transmitting on the WLAN channel. In FIG. 4A, when the number of active stations 422 is 38 stations, the system reaches the peak performance when the stations generate data traffic that results in channel utilization 418 being 67.2%. FIG. 4B shows another simulation result to demonstrate that with 38 active stations, the WLAN throughput 432 (in megabits per second (Mbps)) slows down when the channel utilization 418 exceeds 67.2%.

In an example, the function for the channel utilization threshold 120 may be pre-determined based on the simulation result shown in FIG. 4A. The simulation was done in the following steps. In a first step (Step 1), for a given number of active stations (e.g. 5, 10, 15, . . . , or 50) and amount of traffic load (e.g. 1000 packets per second average packet arrival with 1500 byte payload per packet), the throughput 432 and the channel utilization 418 may be measured. In a second step (Step 2), the traffic load may be varied and Step 1 repeated. In a third step (Step 3), the maximum throughput 432 and its channel utilization 418 may be found. This is the maximum channel utilization 430 for the number of active stations.

Figure 5:
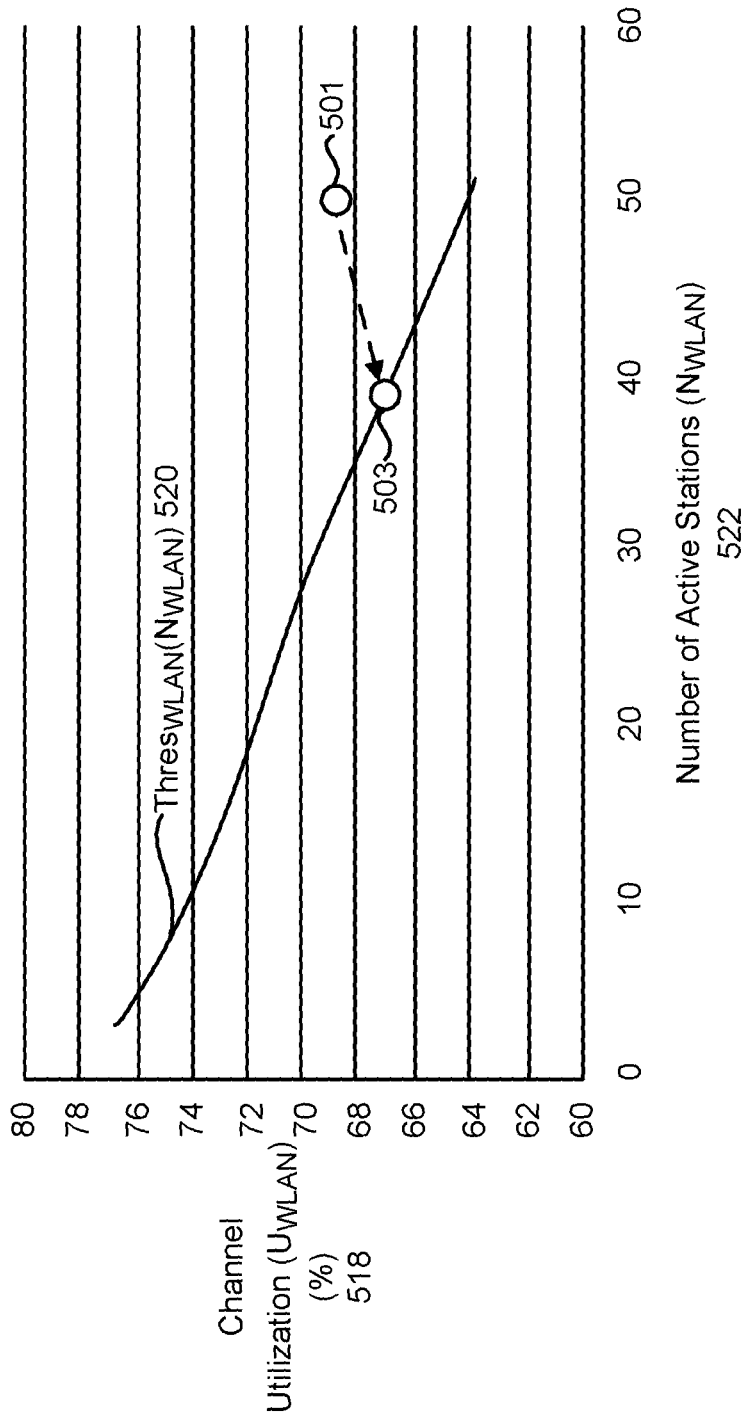
FIG. 5 is an example of changes in channel utilization by offloading.

FIG. 5 is an example of changes in channel utilization 518 by offloading. In this example, Thres$_{WLAN}$($N_{WLAN}$) 520 is a function of the number of active stations ($N_{WLAN}$) 522. Thres$_{WLAN}$($N_{WLAN}$) 520 is indicated by the curve shown in FIG. 5.

At the initial point 501, there are 50 active users using the WLAN and $U_{WLAN}$ 518 is 68.5%. In this case, the WLAN is now overcrowded. Therefore, some WLAN users (e.g., UEs 102) are offloaded to an LTE network until point 503, where $U_{WLAN}$=Thres$_{WLAN}$(38) and $U_{WLAN}$=67.2%.

Figures 6A, 6B:
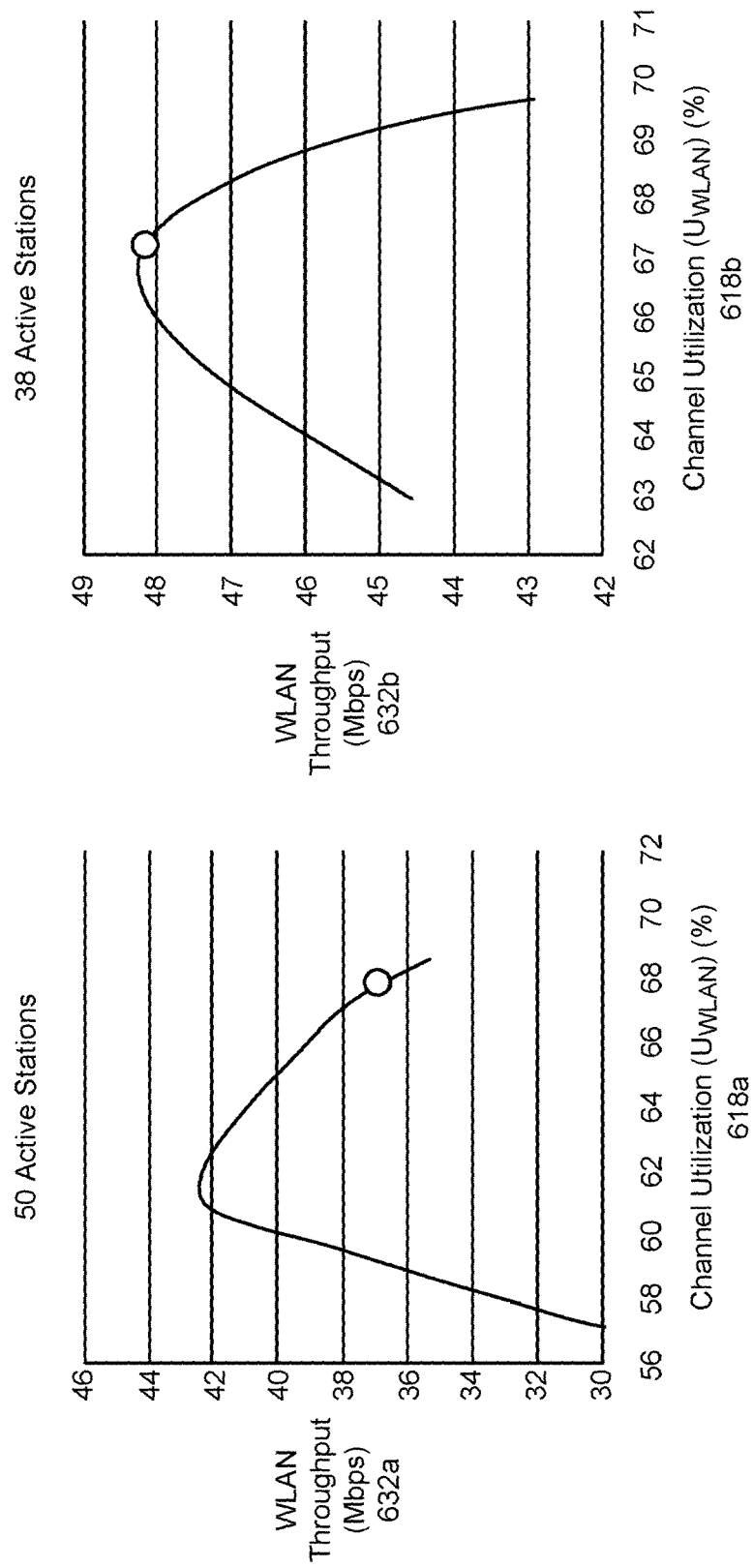
FIGS. 6A and 6B are examples illustrating additional simulation results of WLAN network performance.

FIGS. 6A and 6B are examples illustrating additional simulation results of WLAN network performance. FIG. 6A shows simulation results of the WLAN throughput 632a (in Mbps) versus the channel utilization 618a with 50 active stations. FIG. 6B shows simulation results of the WLAN throughput 632b (in Mbps) versus the channel utilization 618b with 38 active stations.

In FIG. 6A, when the 50 active stations occupy 68.5% of the WLAN channel, the WLAN throughput 632a is 37 Mbps, whereas, in FIG. 6B, when 38 active stations occupy 67.2% of the channel, the WLAN throughput 632b is 48.2 Mbps. As a result, more than 11 Mbps is gained on the WLAN network by this offloading operation, as described in connection with FIG. 5.

As mentioned above, offloading these 12 users to the LTE network may have no negative impact on the LTE total throughput. If LTE has excessive capacity, adding the 12 users will increase its utilization and the throughput will be increased. If LTE is fully utilized, the 12 users will share the LTE bandwidth with the existing users without losing the total LTE throughput.

Figure 7:
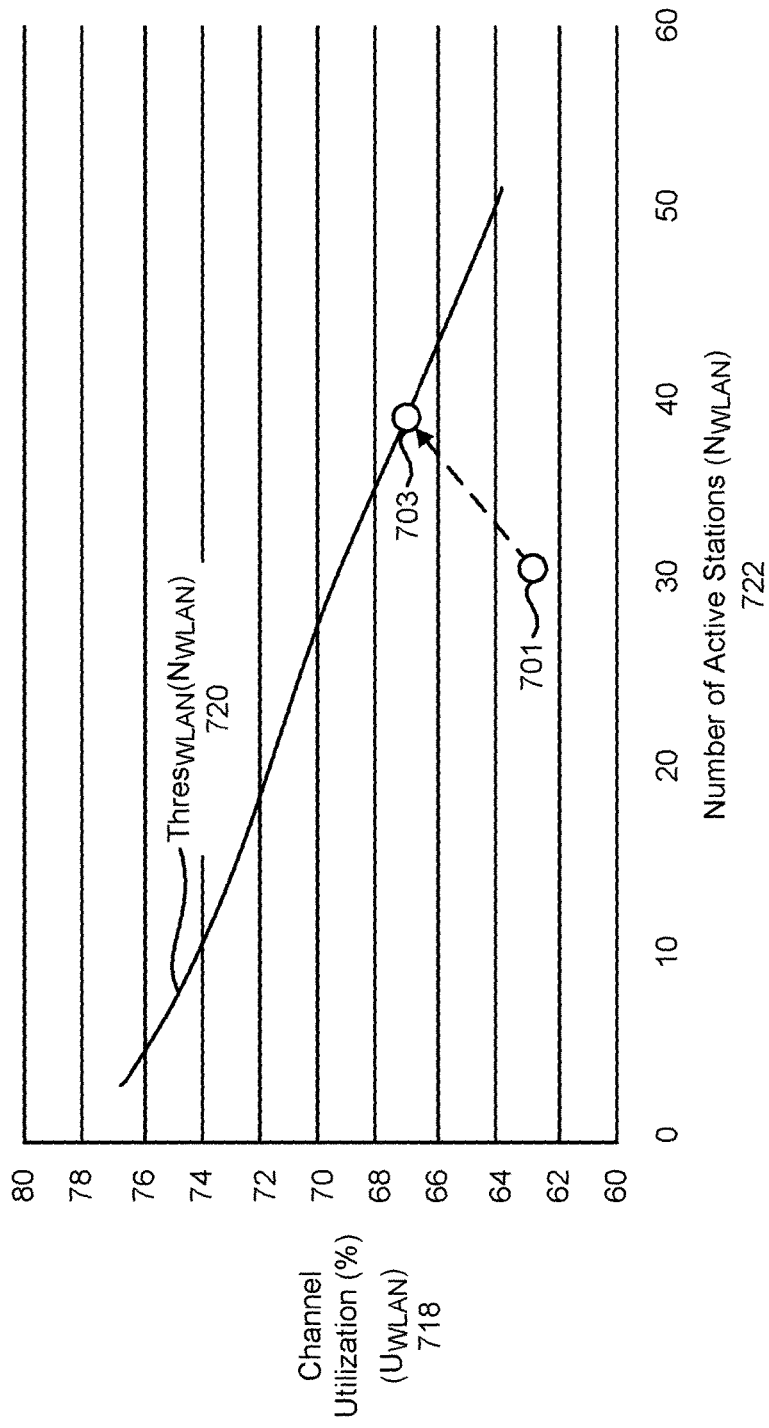
FIG. 7 is another example illustrating WLAN network performance.

FIG. 7 is another example illustrating WLAN network performance. Channel utilization ($U_{WLAN}$) 718 is shown versus the number of active stations ($N_{WLAN}$) 722. In this example, the function Thres$_{WLAN}$($N_{WLAN}$) 720 is indicated by the curve shown in FIG. 7.

At first (point 701), 30 active users are using the WLAN and $U_{WLAN}$ 718 is 62.7%. In this case, the WLAN is now under-utilized. As described in connection with FIG. 3, offloading from LTE to WLAN may occur when LTE is congested (i.e., $U_{LTE}$ 124 is greater than Thres$_{LTE}$ 126). Offloading LTE users to WLAN may continue until point 703, where $U_{WLAN}$=Thres$_{WLAN}$(38) and $U_{WLAN}$=67.2%.

Figure 8:
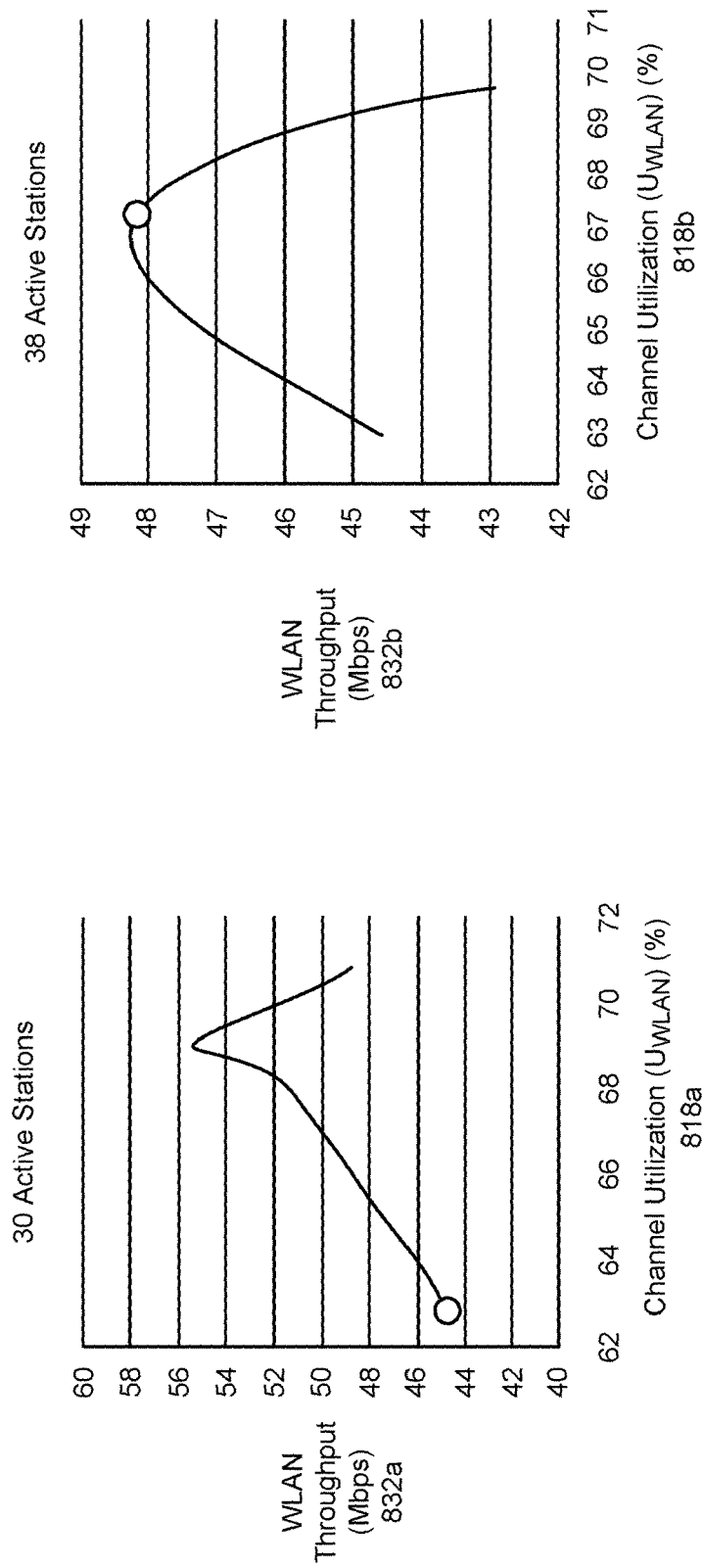
FIGS. 8A and 8B are examples illustrating additional simulation results of WLAN network performance.

FIGS. 8A and 8B are examples illustrating additional simulation results of WLAN network performance. FIG. 8A shows simulation results of the WLAN throughput 832a (in Mbps) versus the channel utilization 818a with 30 active stations. FIG. 8B shows simulation results of the WLAN throughput 832b (in Mbps) versus the channel utilization 818b with 38 active stations.

In FIG. 8A, when the 30 active stations occupy 63% of the WLAN channel, the WLAN throughput 832a is 45 Mbps, whereas, in FIG. 8B, when 38 active stations occupy 67.2% of the channel, the WLAN throughput 632b is 48.2 Mbps. As a result, approximately 3.2 Mbps is gained on the WLAN network by this offloading operation, as described in connection with FIG. 7.

As observed in the discussion of FIGS. 4A-8B, benefits may be realized by dynamically changing a channel utilization threshold 120 for offloading to/from the contention-based access network 112 based on the likelihood of packet collisions. For example, if the threshold for offloading is fixed and does not reflect the current WLAN dynamic collision likelihood, then opportunities for increasing the system throughput may be missed. In the above examples of FIGS. 4A-8B, if it is assumed that there is a fixed channel utilization threshold 120 of 70%, no offloading operation will take place, resulting in degraded performance in the WLAN network. Meanwhile, if the fixed threshold is 62%, the WLAN will remain underutilized even if too many WLAN users are attached to LTE, ending up with losing opportunity for increasing the system throughput.

Figure 9:
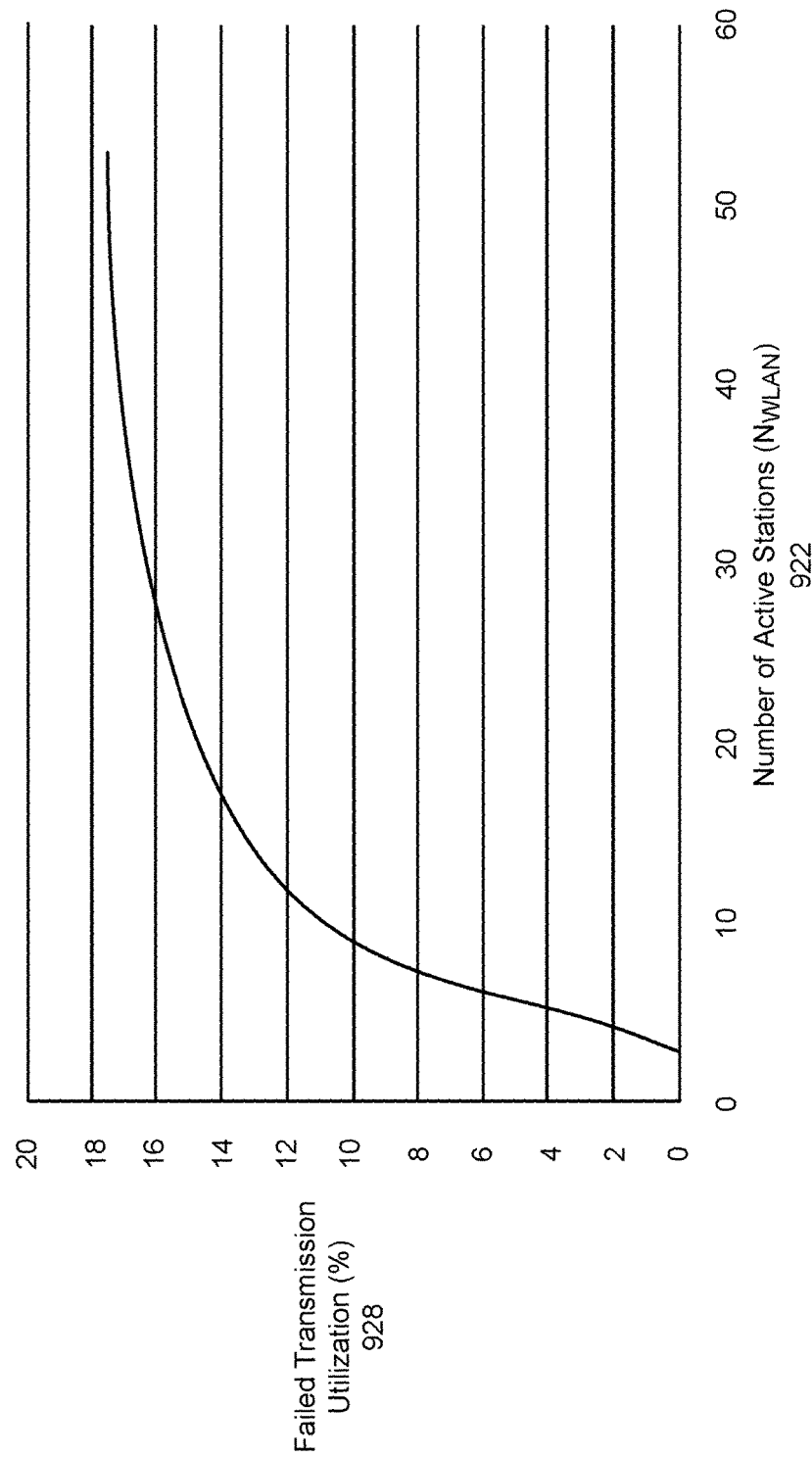
FIG. 9 is an example illustrating the relationship between the number of active stations in a WLAN network and the WLAN failed transmission utilization.

FIG. 9 is an example illustrating the relationship between the number of active stations 922 in a WLAN network and the WLAN failed transmission utilization 928. Specifically, FIG. 9 provides a simulation result of the relationship between the number of active stations ($N_{WLAN}$) 922 in the WLAN network and the WLAN failed transmission utilization 928 when the network reaches the maximum throughput (i.e., maximum channel utilization). As described above, the failed transmission utilization 928 is defined as a ratio of the time where the channel is occupied by collided packets.

Figure 10:
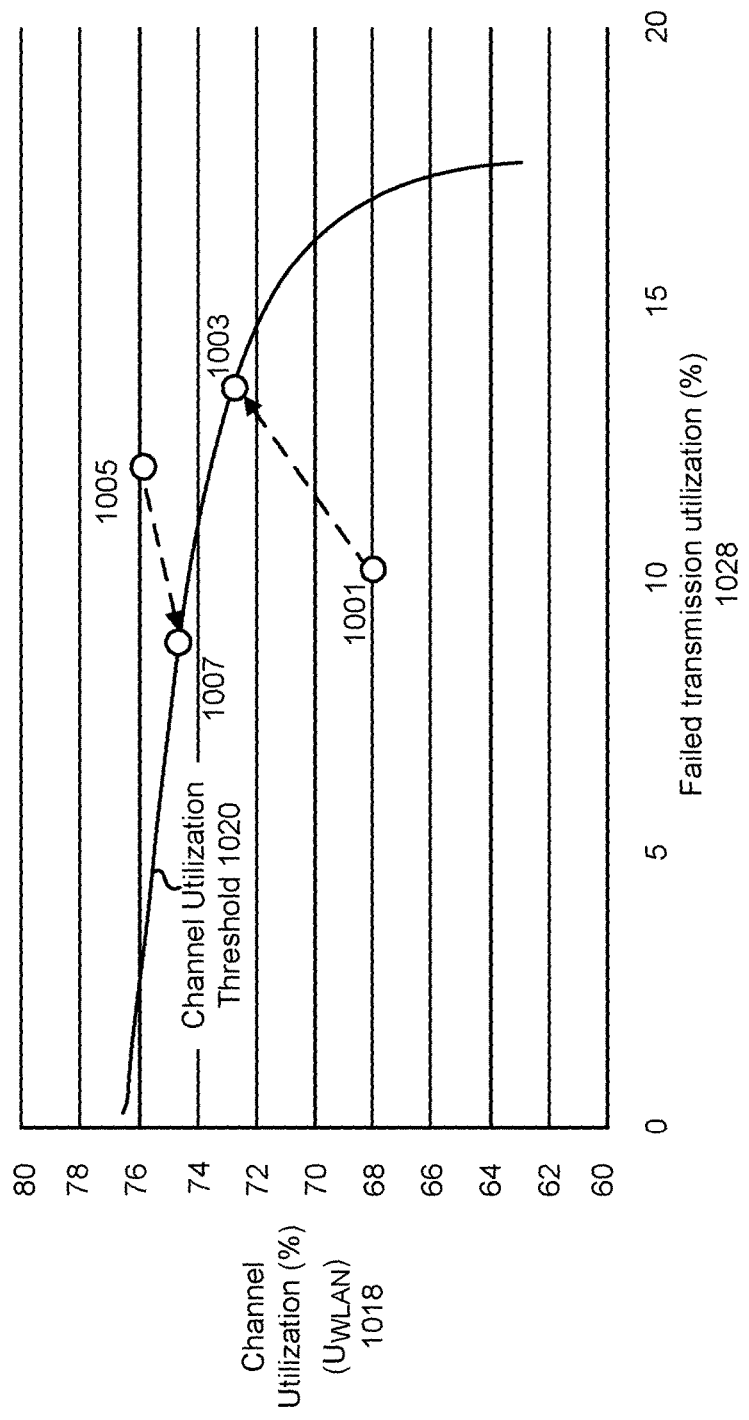
FIG. 10 is an example illustrating the relationship between failed transmission utilization in a WLAN network and the channel utilization ($U_{WLAN}$)

FIG. 10 is an example illustrating the relationship between failed transmission utilization 1028 in a WLAN network and the maximum channel utilization. By combining FIG. 4A and FIG. 9, the relationship between the failed transmission utilization 1028 and the maximum channel utilization can be derived as shown in FIG. 10.

In this example, the WLAN system is over-crowded for the points above the channel utilization threshold 1020 line (including point 1005). On the other hand, the WLAN system is under-utilized for the points below the channel utilization threshold 1020 line (including point 1001).

In an implementation, the WLAN access point 106 may collect the current channel utilization 1018 and the current failed transmission utilization 1028 and report them to the offloading controller 116. Given the pre-determined relationship shown in FIG. 10, the offloading controller 116 may offload users until the current (failed transmission utilization 1028 and channel utilization 1018 become close to the channel utilization threshold 1020. For example, Point 1001 approaches to 1003 by offloading users to WLAN, whereas Point 1005 approaches to 1007 by moving users from WLAN.

It should be noted that in this implementation, the WLAN access point 106 does not have to keep track of the number of active stations 122. Instead, the WLAN access point 106 may monitor the failed transmission utilization 1028 and channel utilization 1018.

Figure 11:
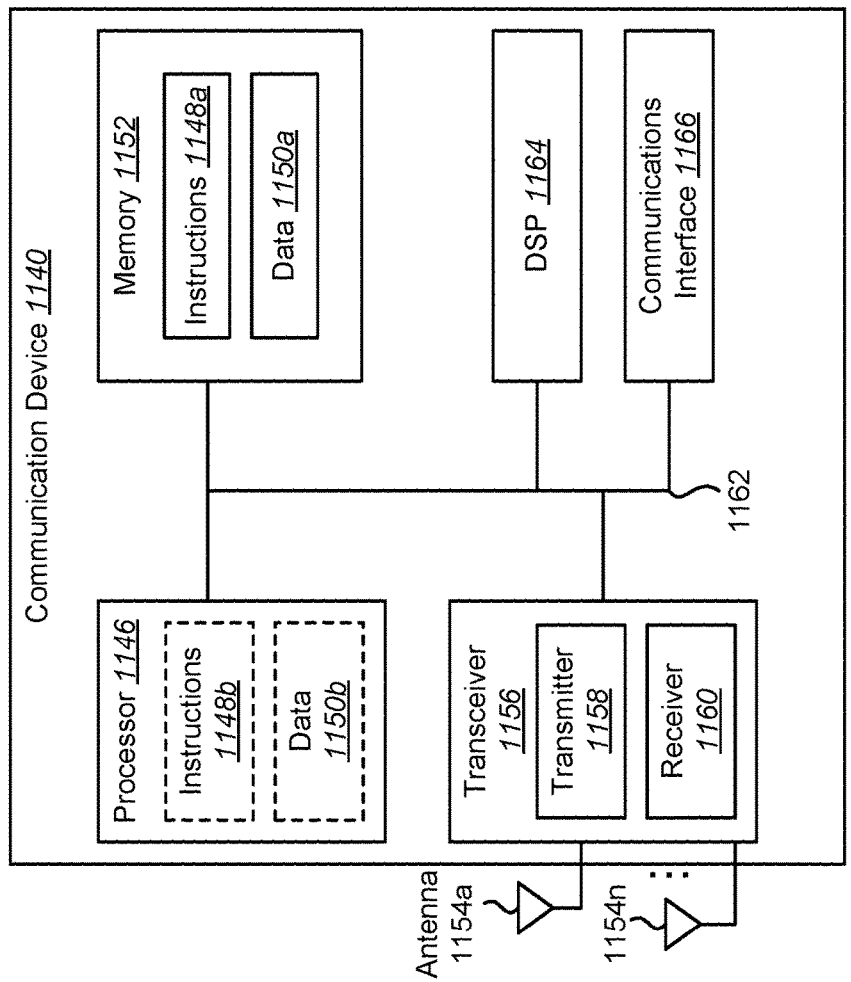
FIG. 11 illustrates various components that may be utilized in a communication device.

FIG. 11 illustrates various components that may be utilized in a communication device 1140. The communication device 1140 described in connection with FIG. 11 may be implemented in accordance with one or more of the UE 102, eNB 104, WLAN access point 106 and offloading controller 116 described in connection with FIG. 1. The communication device 1140 includes a processor 1146 that controls operation of the communication device 1140. The processor 1146 may also be referred to as a central processing unit (CPU). Memory 1152, which may include read-only memory (ROM), random access memory (RAM), a combination of the two or any type of device that may store information, provides instructions 1148a and data 1150a to the processor 1146. A portion of the memory 1152 may also include non-volatile random access memory (NVRAM). Instructions 1148b and data 1150b may also reside in the processor 1146. Instructions 1148b and/or data 1150b loaded into the processor 1146 may also include instructions 1148a and/or data 1150a from memory 1152 that were loaded for execution or processing by the processor 1146. The instructions 1148b may be executed by the processor 1146 to implement one or more of the methods described above.

The communication device 1140 may also include a housing that contains one or more transmitters 1158 and one or more receivers 1160 to allow transmission and reception of data. The transmitter(s) 1158 and receiver(s) 1160 may be combined into one or more transceivers 1156. One or more antennas 1154a-n are attached to the housing and electrically coupled to the transceiver 1156.

The various components of the communication device 1140 are coupled together by a bus system 1162, which may include a power bus, a control signal bus and a status signal bus, in addition to a data bus. However, for the sake of clarity, the various buses are illustrated in FIG. 11 as the bus system 1162. The communication device 1140 may also include a digital signal processor (DSP) 1164 for use in processing signals. The communication device 1140 may also include a communications interface 1166 that provides user access to the functions of the communication device 1140. The communication device 1140 illustrated in FIG. 11 is a functional block diagram rather than a listing of specific components.

Figure 12:
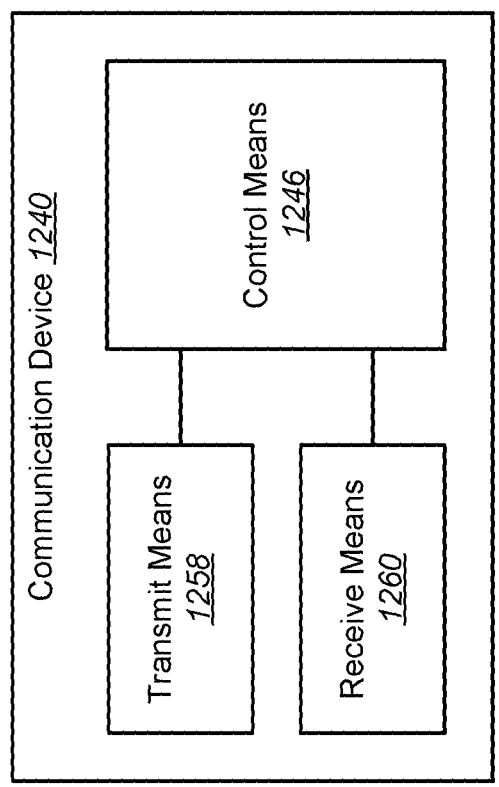
FIG. 12 is a block diagram illustrating one implementation of a communication device in which systems and methods for traffic offloading in multi-RAT networks may be implemented.

FIG. 12 is a block diagram illustrating one implementation of a communication device 1240 in which systems and methods for traffic offloading in multi-RAT networks 108 may be implemented. The communication device 1240 includes transmit means 1258, receive means 1260 and control means 1246. The transmit means 1258, receive means 1260 and control means 1246 may be configured to perform one or more of the functions described in connection with FIG. 1 above. FIG. 11 above illustrates one example of a concrete apparatus structure of FIG. 12. Other various structures may be implemented to realize one or more of the functions of FIG. 1. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the UE 102, eNB 104, WLAN access point 106 and offloading controller 116 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the UE 102, eNB 104, WLAN access point 106 and offloading controller 116 according to the systems and methods described above may be realized as an LSI that is a typical integrated circuit. Each functional block of the UE 102, eNB 104, WLAN access point 106 and offloading controller 116 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. An offloading controller for traffic offloading in a multi-radio-access-technology (RAT) network, comprising:
  a processor;
  memory in electronic communication with the processor, wherein instructions stored in the memory are executable to:
    determine a maximum channel utilization threshold that a contention-based access network allows based on a likelihood of packet collisions, the likelihood of packet collisions being measured by a number of stations actively transmitting on a radio channel of interest for a pre-determined duration, wherein the multi-RAT network comprises a centralized resource management network and the contention-based access network; and
    determine whether to offload one or more user equipments (UEs) on the contention-based access network to the centralized resource management network by comparing a current channel utilization of the contention-based access network and the maximum channel utilization threshold.

2. The offloading controller of claim 1, wherein the maximum channel utilization threshold provides a maximum channel utilization on the contention-based access network as a function of an averaged number of active users on the contention-based access network.

3. The offloading controller of claim 1, wherein the likelihood of packet collisions in the contention-based access network is based on the time where collided packets occupy a radio channel.

4. The offloading controller of claim 1, wherein one or more UEs on the contention-based access network are offloaded to the centralized resource management network when the current channel utilization of the contention-based access network is greater than the maximum channel utilization threshold.

5. The offloading controller of claim 1, wherein when the current channel utilization of the contention-based access network is less than the maximum channel utilization threshold, the instructions are further executable to:
  determine whether to offload one or more UEs on the centralized resource management network to the contention-based access network by comparing a current radio resource utilization on the centralized resource management network and a resource block threshold.

6. The offloading controller of claim 5, wherein one or more UEs on the centralized resource management network are offloaded to the contention-based access network when the current radio resource utilization on the centralized resource management network is greater than the resource block threshold.

7. The offloading controller of claim 5, wherein no offloading occurs when the current radio resource utilization on the centralized resource management network is less than the resource block threshold.

8. The offloading controller of claim 1, wherein the centralized resource management network is a long-term evolution (LTE) network and the contention-based access network is an IEEE 802.11 wireless local area network (WLAN).

9. A method for traffic offloading in a multi-radio-access-technology (RAT) network, comprising:
    determining a maximum channel utilization threshold that a contention-based access network allows based on a likelihood of packet collisions, the likelihood of packet collisions being measured by a number of stations actively transmitting on a radio channel of interest for a pre-determined duration, wherein the multi-RAT network comprises a centralized resource management network and the contention-based access network; and
    determining whether to offload one or more UEs on the contention-based access network to the centralized resource management network by comparing a current channel utilization of the contention-based access network and the maximum channel utilization threshold.

10. The method of claim 9, wherein the maximum channel utilization threshold provides a maximum channel utilization on the contention-based access network as a function of an averaged number of active users on the contention-based access network.

11. The method of claim 9, wherein the likelihood of packet collisions in the contention-based access network is based on the time where collided packets occupy a radio channel.

12. The method of claim 9, wherein one or more UEs on the contention-based access network are offloaded to the centralized resource management network when the current channel utilization of the contention-based access network is greater than the maximum channel utilization threshold.

13. The method of claim 9, wherein when the current channel utilization of the contention-based access network is less than the maximum channel utilization threshold, the method further comprises:
    determining whether to offload one or more UEs on the centralized resource management network to the contention-based access network by comparing a current radio resource utilization on the centralized resource management network and a resource block threshold.

14. The method of claim 13, wherein one or more UEs on the centralized resource management network are offloaded to the contention-based access network when the current radio resource utilization on the centralized resource management network is greater than the resource block threshold.

15. The method of claim 13, wherein no offloading occurs when the current radio resource utilization on the centralized resource management network is less than the resource block threshold.

16. The method of claim 9, wherein the centralized resource management network is a long-term evolution (LTE) network and the contention-based access network is an IEEE 802.11 wireless local area network (WLAN).

17. A non-transitory computer-readable medium having instructions thereon, the instructions comprising:
    code for causing an offloading controller to determine a maximum channel utilization threshold that a contention-based access network allows based on a likelihood of packet collisions, the likelihood of packet collisions being measured by a number of stations actively transmitting on a radio channel of interest for a pre-determined duration, wherein the multi-RAT network comprises a centralized resource management network and the contention-based access network; and
    code for causing the offloading controller to determine whether to offload one or more UEs on the contention-based access network to the centralized resource management network by comparing a current channel utilization of the contention-based access network and the maximum channel utilization threshold.

18. The non-transitory computer-readable medium of claim 17, wherein the maximum channel utilization threshold provides a maximum channel utilization on the contention-based access network as a function of an averaged number of active users on the contention-based access network.

19. The non-transitory computer-readable medium of claim 17, wherein one or more UEs on the contention-based access network are offloaded to the centralized resource management network when the current channel utilization of the contention-based access network is greater than the maximum channel utilization threshold.

20. The non-transitory computer-readable medium of claim 17, wherein when the current channel utilization of the contention-based access network is less than the maximum channel utilization threshold, the instructions further comprises:
    determining whether to offload one or more UEs on the centralized resource management network to the contention-based access network by comparing a current radio resource utilization on the centralized resource management network and a resource block threshold.

* * * * *